United States Patent
Baek

(10) Patent No.: US 10,435,246 B2
(45) Date of Patent: Oct. 8, 2019

(54) EXTENDIBLE FENCES FOR EXTENDIBLE CONVEYORS

(71) Applicant: Rite-Hite Holding Corporation, Milwaukee, WI (US)

(72) Inventor: Anders Stougaard Baek, AarhusC (DK)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 15/691,493

(22) Filed: Aug. 30, 2017

(65) Prior Publication Data
US 2019/0062063 A1 Feb. 28, 2019

(51) Int. Cl.
*B65G 21/14* (2006.01)
*B65G 21/20* (2006.01)

(52) U.S. Cl.
CPC ......... *B65G 21/2072* (2013.01); *B65G 21/14* (2013.01); *B65G 2201/025* (2013.01); *B65G 2201/0264* (2013.01)

(58) Field of Classification Search
CPC ....................................................... B65G 21/14
(Continued)

(56) References Cited

U.S. PATENT DOCUMENTS 2,095,494 A 10/1937 Dobbs
2,968,382 A 1/1961 Oury
(Continued)

FOREIGN PATENT DOCUMENTS

DE 102010005267 7/2011
DE 102010033115 2/2012
(Continued)

OTHER PUBLICATIONS

International Searching Authority, "International Search Report," issued in connection with International Patent Application No. PCT/US2018/048318, dated Dec. 4, 2018, 7 pages.
(Continued)

*Primary Examiner* — Joseph A Dillon, Jr.
(74) *Attorney, Agent, or Firm* — Hanley, Flight & Zimmerman, LLC

(57) ABSTRACT

Extendible fences for extendible conveyors are disclosed. An example conveyor includes a fence assembly having a plurality of channel segments including at least a base channel segment, an intermediate channel segment, and a distal channel segment. The fence assembly is adjustable in a lengthwise direction such that the fence assembly is longer in the lengthwise direction when a main conveyor assembly is in a fully extended configuration than when the main conveyor assembly is in a fully retracted configuration. The intermediate channel segment is interposed between the base channel segment and the distal channel segment with respect to the lengthwise direction. Each channel segment of the plurality of channel segments includes sidewalls extending upward from a bottom panel. The intermediate channel segment to move in translation in the lengthwise direction relative to an intermediate conveyor section. The bottom panel of the intermediate channel segment is positioned between an upper portion of a conveyor belt of the main conveyor assembly and an upper load bearing surface of the intermediate conveyor section. The upper portion of the conveyor belt being interposed between the sidewalls with reference to a lateral direction, where the lateral direction is horizontal and perpendicular to the lengthwise direction.

30 Claims, 8 Drawing Sheets

(58) Field of Classification Search
USPC .................................. 198/595, 596, 594
See application file for complete search history.

(56) References Cited

U.S. PATENT DOCUMENTS

| | | | |
|---|---|---|---|
| 3,168,946 A | 2/1965 | Gay | |
| 3,554,355 A | 1/1971 | Berg | |
| 3,556,254 A | 1/1971 | Lambert | |
| 3,613,866 A * | 10/1971 | Arndt | B65G 21/14 198/313 |
| 3,835,980 A | 9/1974 | Brooks, Jr. | |
| 4,312,540 A | 1/1982 | Thompson | |
| 4,474,287 A | 10/1984 | Thompson | |
| 4,523,669 A * | 6/1985 | Smith | B65G 21/14 198/313 |
| 4,643,299 A | 2/1987 | Calundan | |
| 5,035,313 A | 7/1991 | Smith | |
| 5,190,352 A | 3/1993 | LeBegue et al. | |
| 5,312,149 A | 5/1994 | Boone | |
| 5,351,809 A | 10/1994 | Gilmore et al. | |
| 5,423,413 A | 6/1995 | Gilmore | |
| 5,487,462 A | 1/1996 | Gilmore | |
| 5,498,119 A | 3/1996 | Faivre | |
| 5,642,803 A | 7/1997 | Tanaka | |
| 5,685,416 A | 11/1997 | Bonnet | |
| 5,796,052 A | 8/1998 | Christmann | |
| 6,006,893 A | 12/1999 | Gilmore et al. | |
| 6,029,797 A * | 2/2000 | Olsson | B65G 17/42 198/778 |
| 6,186,304 B1 * | 2/2001 | Håkansson | B28C 5/4251 193/25 A |
| 6,431,346 B1 | 8/2002 | Gilmore et al. | |
| 6,481,563 B1 | 11/2002 | Gilmore | |
| 6,481,566 B1 * | 11/2002 | Horak | B65G 21/08 198/595 |
| 6,484,862 B1 | 11/2002 | Gilmore et al. | |
| 6,533,096 B2 | 3/2003 | Gilmore et al. | |
| 6,571,938 B2 * | 6/2003 | Gilmore | B65G 21/14 198/594 |
| 6,823,985 B2 | 11/2004 | Gilmore et al. | |
| 6,971,508 B2 * | 12/2005 | Kotaki | B65G 15/08 198/811 |
| 7,108,125 B2 | 9/2006 | Gilmore et al. | |
| 7,168,555 B2 | 1/2007 | Peterson | |
| 7,370,753 B2 * | 5/2008 | Yang | B65G 21/14 193/35 TE |
| 7,448,486 B1 | 11/2008 | Frankl et al. | |
| 7,823,715 B2 * | 11/2010 | Kinnunen | B65G 21/14 193/35 TE |
| 7,909,153 B2 | 3/2011 | Pogue | |
| 8,069,977 B2 * | 12/2011 | Avery | B65G 15/62 198/750.1 |
| 8,408,383 B2 * | 4/2013 | Whittlesey | A22C 11/02 198/617 |
| 8,622,199 B2 | 1/2014 | Windfield et al. | |
| 8,662,291 B2 | 3/2014 | Henderson | |
| 9,045,289 B2 | 6/2015 | Carpenter | |
| 9,169,071 B2 | 10/2015 | Baek, IV et al. | |
| 9,187,249 B2 * | 11/2015 | Rausch | B65G 21/14 |
| 9,315,328 B2 | 4/2016 | Baek, IV | |
| 9,950,868 B1 * | 4/2018 | Baek | B65G 23/22 |
| 2001/0009217 A1 | 7/2001 | Gilmore et al. | |
| 2002/0153229 A1 * | 10/2002 | Gilmore | B65G 21/14 198/568 |
| 2003/0029694 A1 | 2/2003 | Gilmore | |
| 2004/0112719 A1 | 6/2004 | Gilmore et al. | |
| 2005/0217981 A1 | 10/2005 | Peterson | |
| 2006/0011455 A1 * | 1/2006 | Petersen | B65G 21/14 198/812 |
| 2009/0294246 A1 * | 12/2009 | Pogue | B65G 21/14 198/313 |
| 2013/0228419 A1 * | 9/2013 | Baek, IV | B65G 21/14 198/615 |
| 2013/0233676 A1 | 9/2013 | Baek, IV et al. | |
| 2014/0326580 A1 * | 11/2014 | Carpenter | B65G 21/14 198/571 |
| 2014/0346013 A1 * | 11/2014 | Carpenter | B65G 43/02 198/617 |
| 2015/0001039 A1 * | 1/2015 | Fehr | B65G 21/14 198/313 |
| 2015/0060241 A1 * | 3/2015 | Baek, IV | B65G 21/14 198/812 |
| 2015/0259149 A1 * | 9/2015 | Hartmann | B65G 41/02 198/617 |
| 2016/0264366 A1 * | 9/2016 | Heitplatz | B65G 21/14 |
| 2018/0111762 A1 * | 4/2018 | Baek | B65G 23/22 |

FOREIGN PATENT DOCUMENTS

| | | |
|---|---|---|
| EP | 1568628 | 8/2005 |
| EP | 2878554 | 6/2015 |
| FR | 2525570 | 10/1983 |
| WO | 0208098 | 1/2002 |
| WO | 2004052759 | 6/2004 |
| WO | 2006068443 | 6/2006 |

OTHER PUBLICATIONS

International Searching Authority, "Written Opinion," issued in connection with International Patent Application No. PCT/US2018/048318, dated Dec. 4, 2018, 19 pages.

* cited by examiner

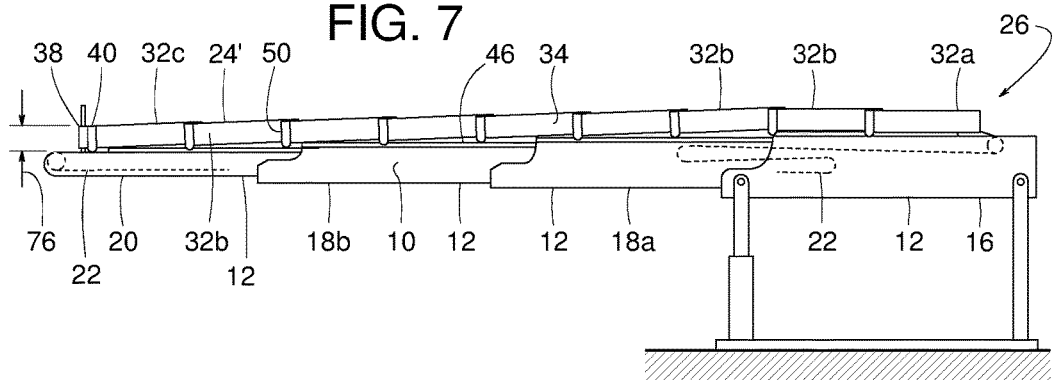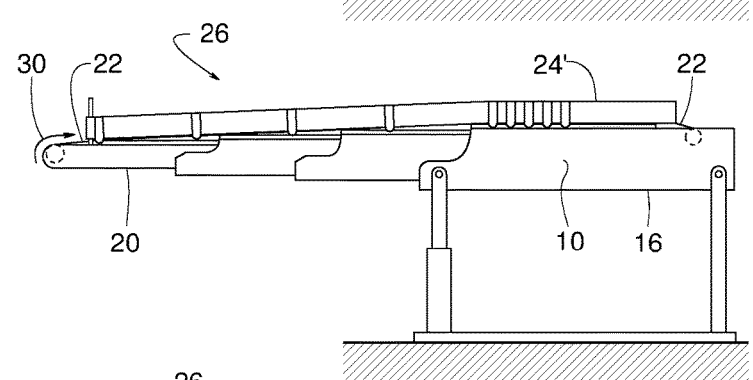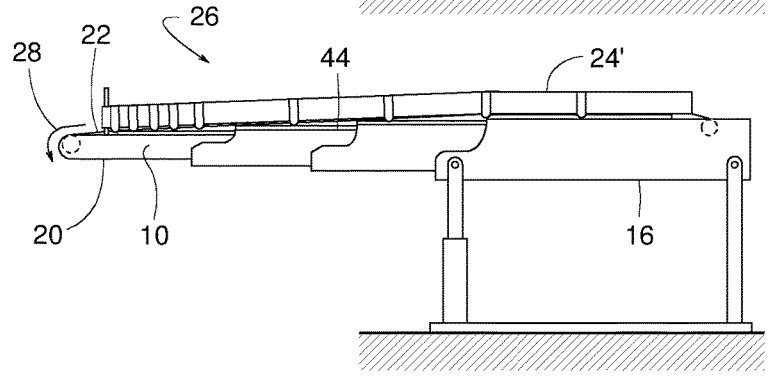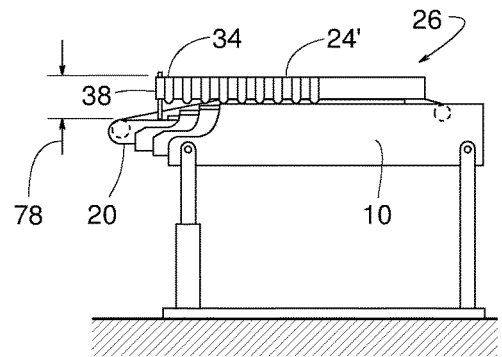

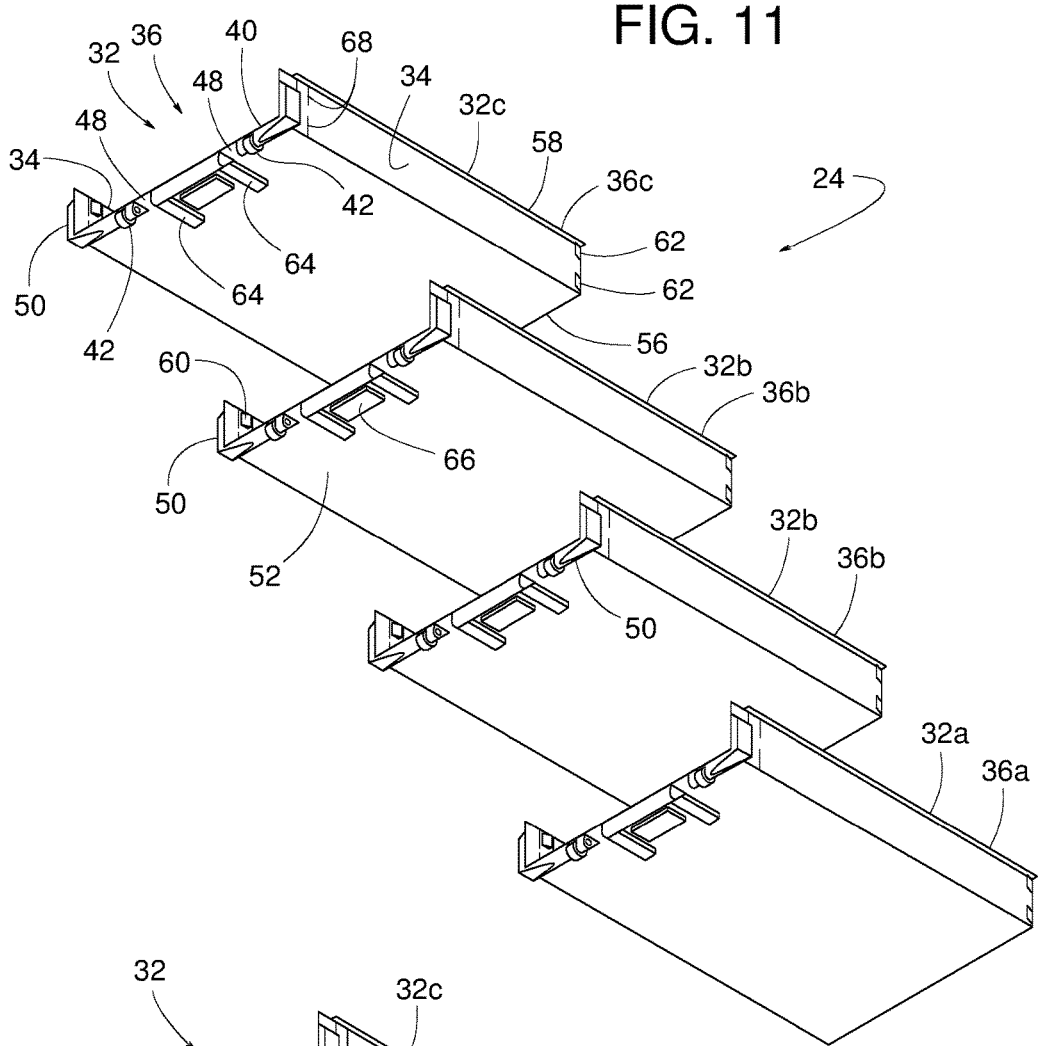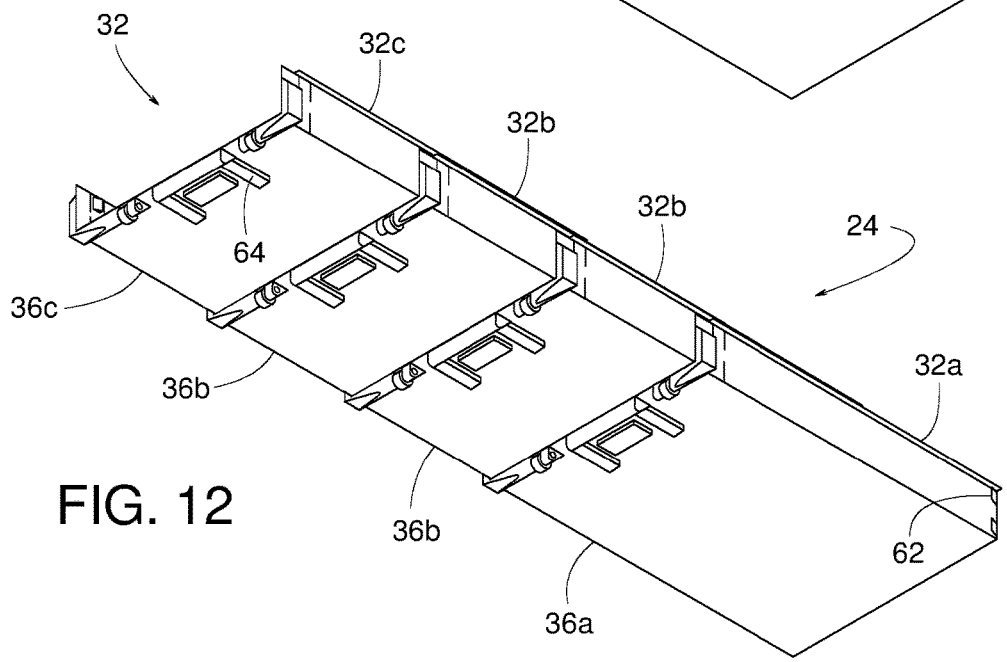

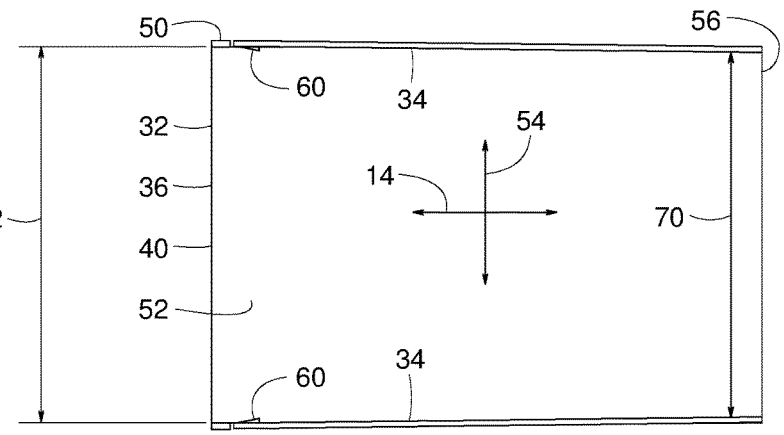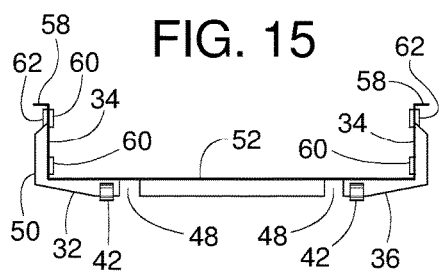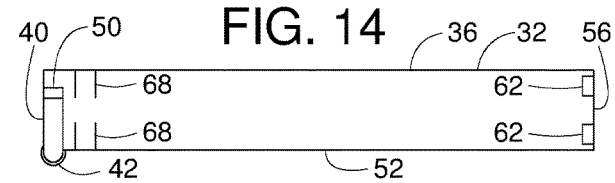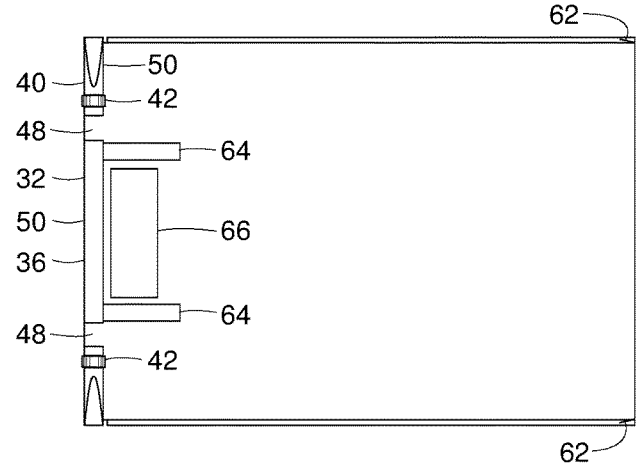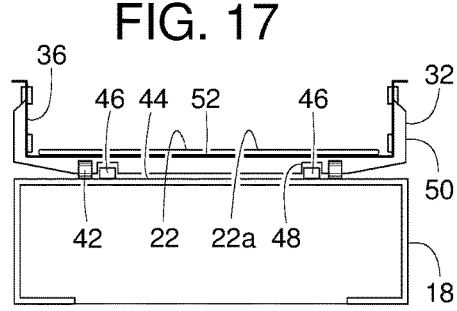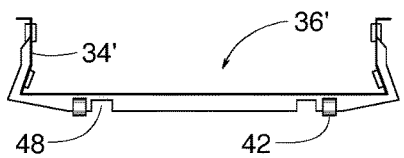

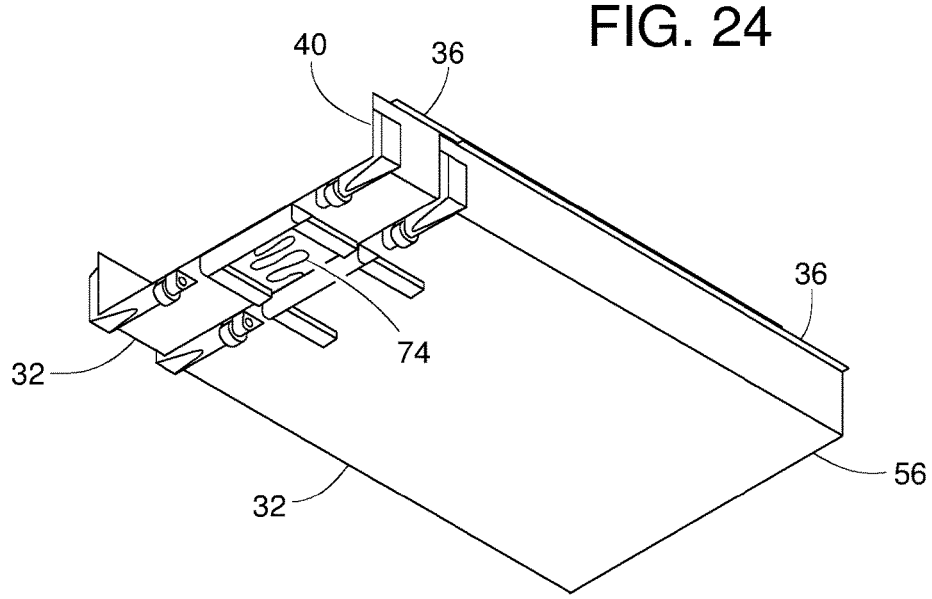
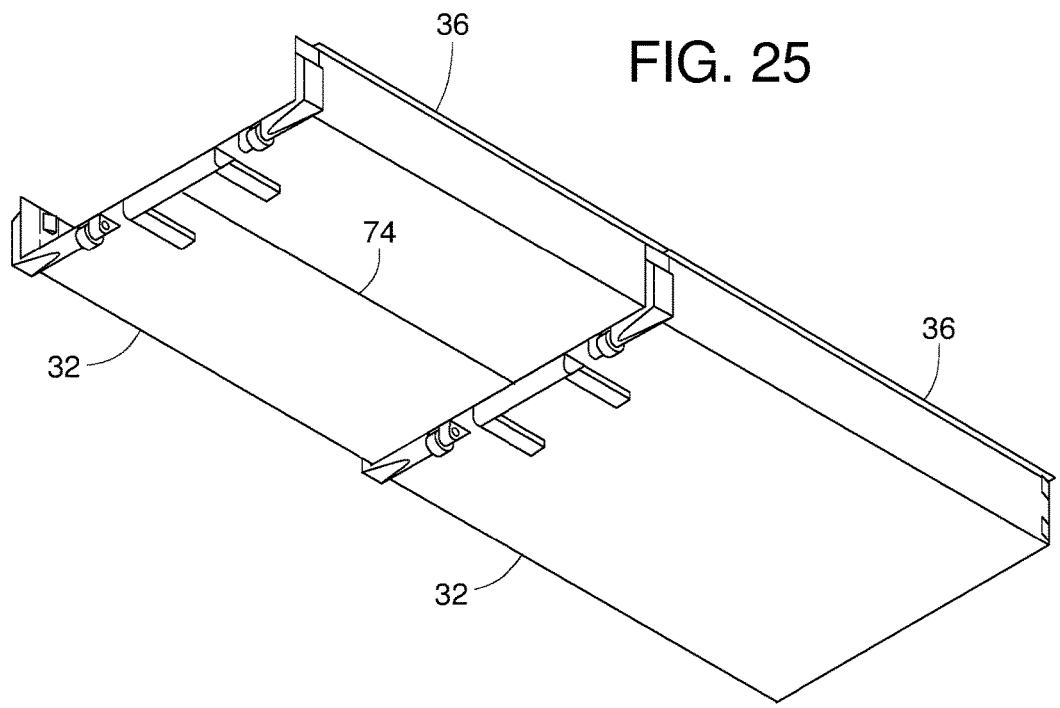

EXTENDIBLE FENCES FOR EXTENDIBLE CONVEYORS

FIELD OF THE DISCLOSURE

This patent generally pertains to conveyors and, more specifically, to extendible fences for extendible conveyors.

BACKGROUND

Conveyors include a plurality of rollers (e.g., cylindrical or spherical rollers) for moving boxes, luggage, parcels and other items over the length of an upper conveying surface of the conveyor. The upper conveying surface can be horizontal, or it can be at a fixed or adjustable incline (positive or negative slope). Certain conveyors have a series of telescopically connected sections that make the upper conveying surface extendible in length.

Some conveyors have powered rollers that propel the items. Other conveyors have passive free-spinning rollers that convey the items by gravity. In some cases, a moving belt overlays the rollers or some other belt-supporting surface to support the conveyed items with a smoother, more evenly distributed surface. The moving belt helps prevent conveyed items from getting caught in transitional areas between adjacent conveyor sections or between rollers within a section.

BRIEF DESCRIPTION OF THE DRAWINGS

FIG. 7 is a side view similar to FIG. 1, but showing an example fence assembly disclosed herein that is added to the main conveyor assembly.

FIG. 8 is a side view similar to FIG. 7, but showing the example main conveyor assembly in a partially extended configuration and an example conveyor belt configured for movement in a reverse direction.

FIG. 9 is a side view similar to FIG. 8, but showing the example conveyor belt configured for movement in a forward direction.

FIG. 10 is a side view similar to FIGS. 7-9, but showing the example main conveyor assembly in the fully retracted configuration.

FIG. 11 is a bottom perspective, exploded view of another example fence assembly disclosed herein prior to being assembled.

FIG. 12 is a bottom perspective view similar to FIG. 11, but showing the example fence assembly assembled in a nested telescopic arrangement.

FIG. 13 is a top view of FIG. 14.

FIG. 14 is a side view of an example channel segment constructed in accordance with the teachings disclosed herein.

FIG. 15 is a left end view of FIG. 14.

FIG. 16 is a bottom view of FIG. 14.

FIG. 17 is an end view similar to FIG. 15, but showing the example channel segment attached to an example intermediate conveyor section.

FIG. 18 is an end view similar to FIG. 15, but showing another example channel segment constructed in accordance with the teachings disclosed herein.

FIG. 24 is a bottom, perspective view of another example of channel segments disclosed herein shown in the fully retracted configuration.

FIG. 25 is a bottom perspective view similar to FIG. 24, but showing the example channel segments in the fully extended configuration.

DETAILED DESCRIPTION

Figure 1:
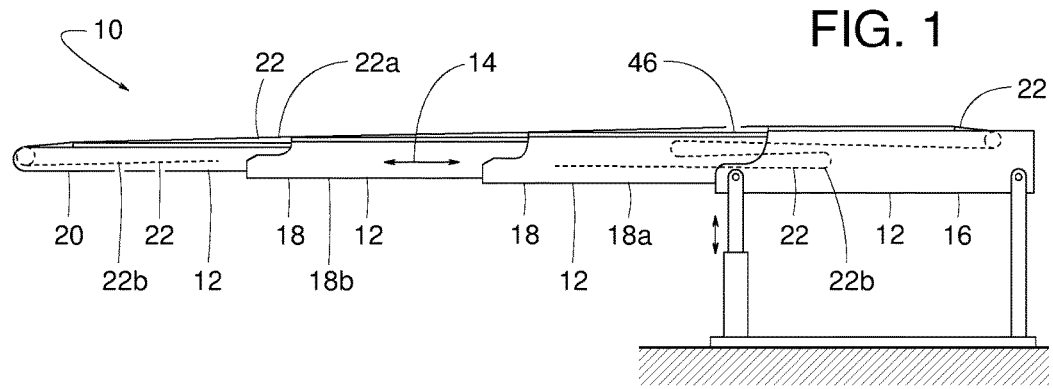
FIG. 1 is a side view of an example main conveyor assembly constructed in accordance with the teachings disclosed herein. The example main conveyor assembly of FIG. 1 is in a fully extended configuration.
Figure 2:
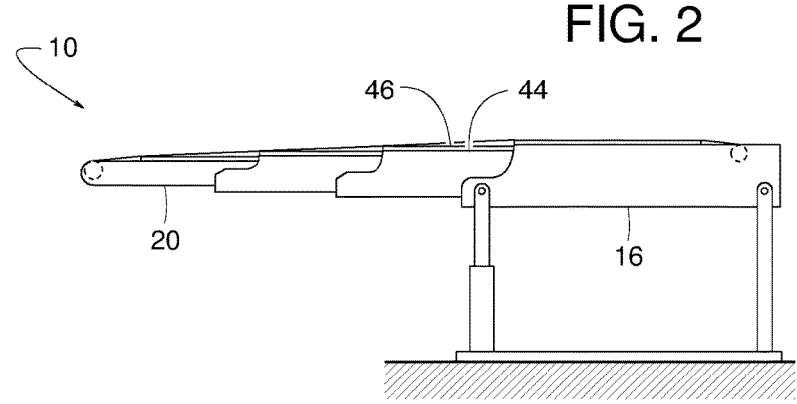
FIG. 2 is a side view similar to FIG. 1, but showing the example main conveyor assembly in a partially extended configuration.
Figure 3:
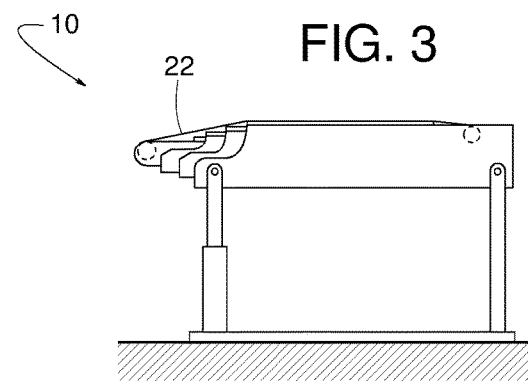
FIG. 3 is a side view similar to FIGS. 1 and 2, but showing the example main conveyor assembly in a fully retracted configuration.
Figure 4:
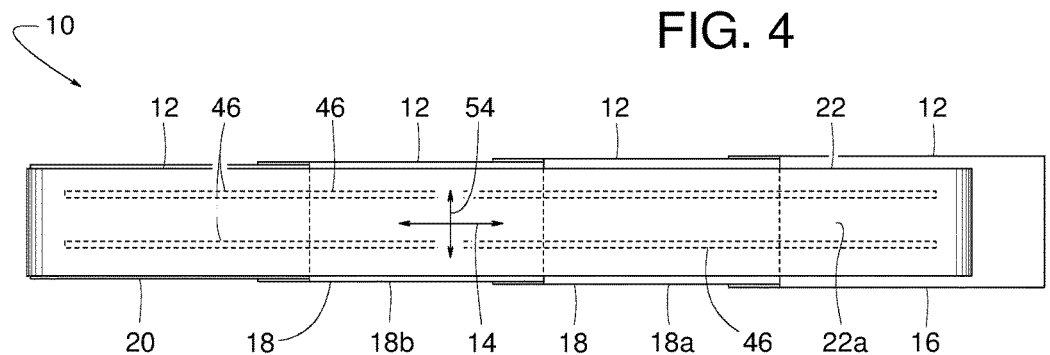
FIG. 4 is a top view of FIG. 1.
Figure 5:
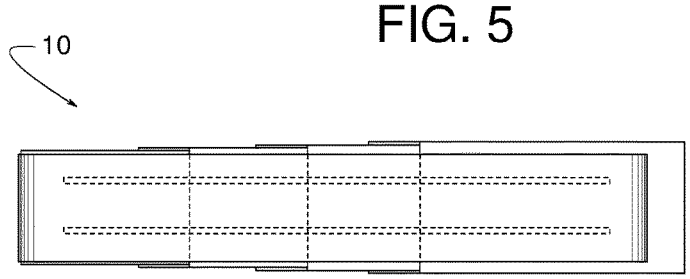
FIG. 5 is a top view of FIG. 2.
Figure 6:
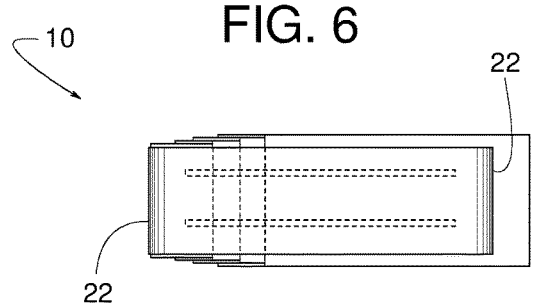
FIG. 6 is a top view of FIG. 3.

An extendible belt conveyor disclosed herein includes a telescopic fence assembly with sidewalls that passively and/or automatically extend and retract lengthwise in response to the belt conveyor adjusting (e.g., telescopically adjusting or changing) in length. In some examples, the fence assembly includes a series of telescopically interconnected channel segments each having a bottom panel that fits between a belt and an upper load bearing surface of the conveyor's main assembly. To prevent conveyed items from falling sideways off the belt conveyor, the sidewalls extend upward from the bottom panel to a height (e.g., of several centimeters) above the belt. In some examples, the channel segments are of equal size and/or shape yet can still fit together in a nested arrangement.

FIGS. 1-6 show an example of a main conveyor assembly 10 including a plurality of conveyor sections 12 telescopically interconnected to extend and retract in a lengthwise direction 14. Although the conveyor assembly 10 of the illustrated example is shown having four conveyor sections 12, the conveyor assembly 10 can have any plural number of conveyor sections 12. In the illustrated example, the conveyor sections 12 include a base conveyor section 16, at least one intermediate conveyor section 18 (e.g., a first intermediate conveyor section 18a and a second intermediate section 18b), and a distal conveyor section 20. The conveyor assembly 10 is shown in a fully extended configuration in FIGS. 1 and 4, a partially extended configuration in FIGS. 2 and 5, and a fully retracted configuration in FIGS. 3 and 6. A conveyor belt 22 overlaying the conveyor sections 12 is powered to convey items (e.g., products, luggage, boxes, packages, etc.) in either direction (e.g., a forward direction, a rearward direction) along the conveyor's length. Underneath an upper portion 22a of the conveyor belt 22, a return portion 22b of the belt 22 travels along a winding path that automatically adjusts to accommodate the varying length of the conveyor assembly 10. Examples of the conveyor assembly 10 include, but are not limited to, the conveyors disclosed in U.S. Pat. Nos. 9,315, 328; 9,169,071; 5,796,052 and 4,643,299; all of which are specifically incorporated herein by reference.

To prevent conveyed items from (e.g., accidentally) falling off the (e.g., lateral) sides of the conveyor assembly 10, an adjustable length fence assembly 24' disclosed herein is added to the main conveyor assembly 10 to provide or create a conveyor 26, as shown in FIGS. 7-10. The conveyor 26 is shown in an example fully extended position in FIG. 7, an example partially extended position in FIGS. 8 and 9, and an example fully retracted position in FIG. 10. In the partially extended configuration, as shown for example in FIGS. 8 and 9, the fence assembly 24' shifts toward either distal conveyor section 20 or the base conveyor section 16, depending on whether the conveyor belt 22 is traveling in a forward direction 28 or a reverse direction 30. An explanation and benefit of this will be described later.

To enable a fence assembly 24 to automatically and passively adjust its length in response to the conveyor assembly 10 extending and retracting, some examples of the fence assembly 24 are constructed as shown in FIGS. 11-17. In the illustrated example, the fence assembly 24 includes a plurality of telescopically interconnected fence segments 32 (e.g., a base fence segment 32a, at least one intermediate fence segment 32b, and a distal fence segment 32c). Each fence segment 32 has a pair of sidewalls 34. In examples where the fence segment 32 is in the shape of a channel such as, for instance, the examples shown in FIGS. 11-17, the fence segment 32 can be more specifically referred to as a channel segment 36 (e.g., a base channel segment 36a, at least one intermediate channel segment 36b, and a distal channel segment 36c). In other words, a channel segment is one example of a fence segment. In the illustrated example, the channel segment 36 has a U-shaped profile. In some examples, a mounting apparatus 38 (e.g., a bracket, an actuator, a sliding mechanism, a fastener, a spring, etc.) couples a front end 40 of the distal channel segment 36c to the distal conveyor section 20 while the base channel segment 36a is fastened to the base conveyor section 16. Intermediate channel segments 36b are free to slide lengthwise between the distal channel segment 36c and the base channel segment 36a.

Figure 19:
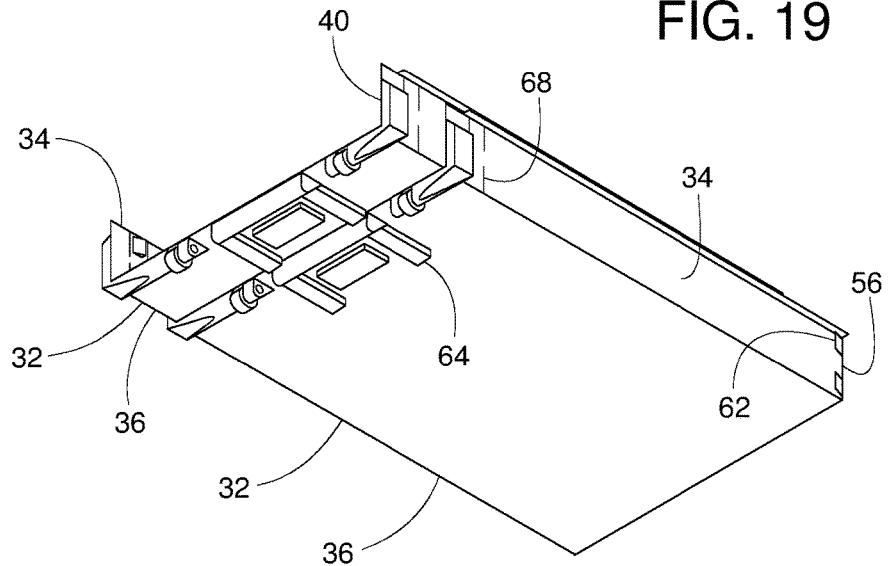
FIG. 19 is a bottom, perspective view of example channel segments disclosed herein shown in a fully retracted configuration.
Figure 20:
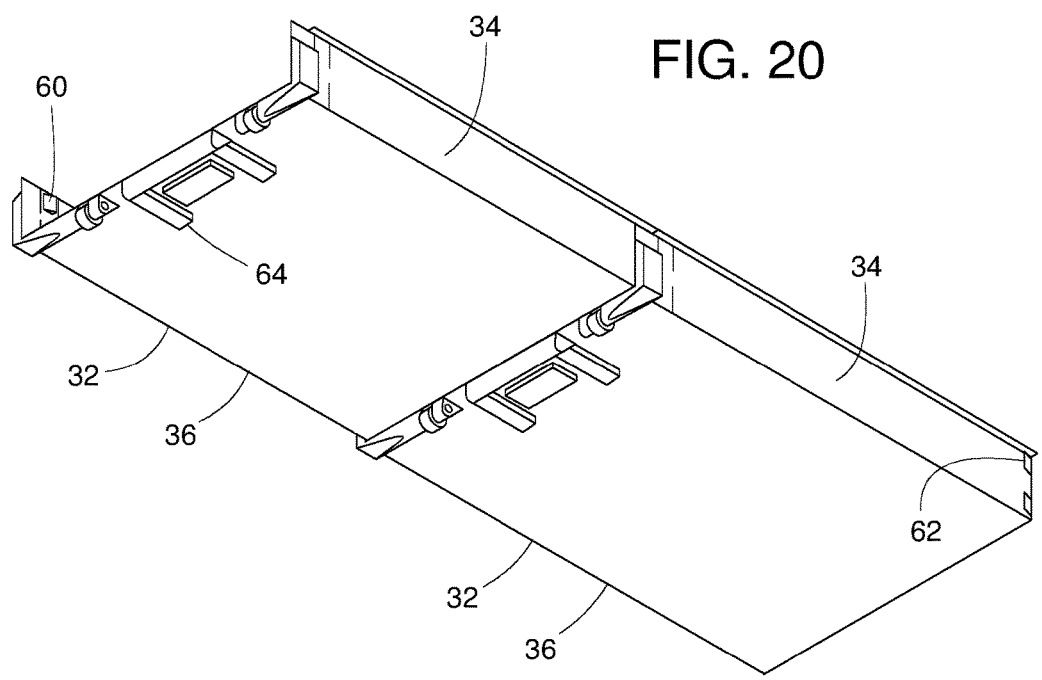
FIG. 20 is a bottom, perspective view similar to FIG. 19, but showing the example channel segments in the fully extended configuration.
Figure 21:
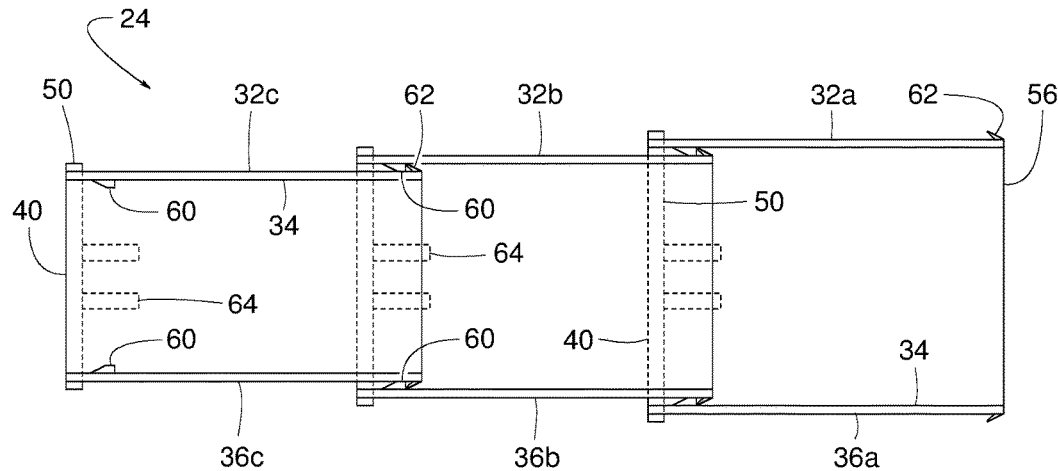
FIG. 21 is a top schematic view of an example fence assembly constructed in accordance with the teachings disclosed herein, where the example fence assembly is in a fully extended configuration.
Figure 22:
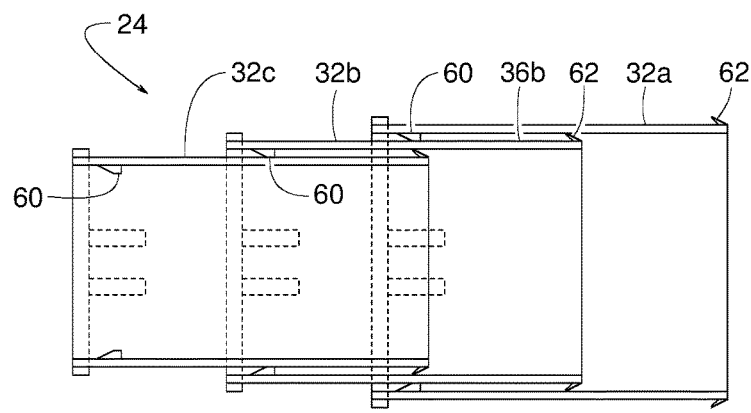
FIG. 22 is a top schematic view similar to FIG. 21, but showing the example fence assembly in the partially extended configuration.
Figure 23:
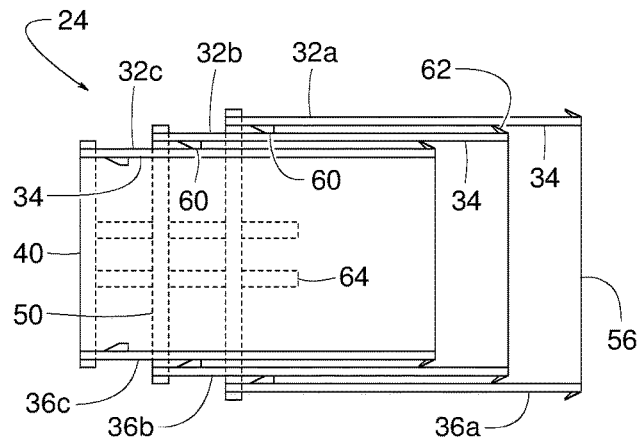
FIG. 23 is a top schematic view similar to FIGS. 21 and 22, but showing the example fence assembly in the fully retracted configuration.

FIG. 11 is an exploded view and FIG. 12 is an assembled view that show how the channel segments 36 nest in a telescopic arrangement. FIGS. 13-16 are different views (e.g., a set of orthogonal drawings) of the channel segment 36. FIG. 17 is an end view similar to FIG. 15, but showing the channel segment 36 attached to the conveyor section 18. In the illustrated example shown in FIG. 17, the rollers 42 roll on an upper load bearing surface 44 of the conveyor section 18, a plurality of guide track segments 46 guide a track-following feature 48 of a reinforcing structure 50 at the front end 40 of the channel segment 36, and the channel segment's bottom panel 52 is sandwiched between the conveyor belt 22 and the conveyor section's upper load bearing surface 44. FIG. 18 is similar to FIG. 15, but showing an alternate example channel segment 36'. FIGS. 19 and 20 show (e.g., two) channel segments 36 in the fully retracted and fully extended configurations. FIGS. 21-23 schematically illustrate the fence assembly 24 in an extended position (FIG. 21), an intermediate position (FIG. 22) and a retracted position (FIG. 23).

In some examples, each channel segment 36 includes the bottom panel 52 extending widthwise in a lateral direction 54 between the pair of sidewalls 34. In the illustrated example, the lateral direction 54 is horizontal and perpendicular to the lengthwise direction 14. Channel segment 36 extends in the lengthwise direction 14 from the front end 40 to a back end 56 of the channel segment 36. In the illustrated example, the front end 40 points toward the distal conveyor section 20, and the back end 56 points toward the base conveyor section 16. Some examples of the channel segment 36 further include the reinforcing structure 50 at the front end 40, the upper flanges 58, at least one track-following feature 48 (e.g., a slot and/or track guide rollers) near the front end 40, the weight-supporting rollers 42 (e.g., wheels) for reducing (e.g., minimizing) drag (e.g., friction) between the bottom panel 52 of the channel segment 36 and the upper load bearing surface 44 on the conveyor sections 12, one or more front catches 60, one or more rear catches 62, one or more stop blocks 64, and/or a magnet 66.

The magnet 66 is attached to the underside of the bottom panel 52 and urges the channel segment 36 downwardly toward the upper load bearing surface 44 of the conveyor sections 12. In some examples, the magnet 66 is omitted, and the channel segment's weight and the weight of the belt 22 is sufficient to hold or maintain the channel segment 36 down against the conveyor sections 12.

Stop blocks 64 are attached to the underside of the bottom panel 52 and are aligned to engage the front end of the reinforcing structure 50 of an adjacent channel segment 36. Reinforcing structure 50 engages the stop blocks 64, as shown in FIGS. 19, 23 and 24, to limit the extent to which two channel segments 36 can overlap each other. Example materials of the stop blocks 64 include, but are not limited to, shock absorbing polymers, such as, for example, polyurethane, nylon, neoprene, etc. Examples materials of the reinforcing structure 50 include, but are not limited to, metal and plastic.

Front catches 60 and rear catches 62 protrude laterally in opposite directions from the sidewalls 34 and limit how far two overlapping channel segments 36 can extend from each other. In the fully extended configuration, as shown in FIG. 20 and schematically illustrated in FIG. 21, the front catches 60 engage the rear catches 62. In the partially extended configuration (FIG. 22) and in the fully retracted configuration (FIGS. 19 and 23), the catches 60 and 62 are spaced apart from each other. To ensure that the catches 60 and 62 do not pass by each other due to lateral clearance between them, some examples of the catches 60 and 62 are resiliently flexible and press laterally against an adjacent sidewall 34. FIGS. 21-23, for instance, shows front catches 60 of an intermediate channel segment pressing laterally inward against the sidewalls of a distal channel segment. FIGS. 21-23 also shows the rear catches 62 of intermediate channel segment 36b pressing laterally outward against the sidewalls of a base channel segment. In some examples, the slits 68 in sidewalls 34 provide the front catches 60 with their flexibility. In some examples, the rear catches 62 are flexible by virtue of the rear catches 62 being made of sheet metal or other flexible material(s).

Example materials of the bottom panel 52, the sidewalls 34 and flanges 58 include, but are not limited to, sheet metal, plastic, fiber reinforced plastic, etc. In some examples, the plurality of channel segments 36 are substantially similar (e.g., identical) to reduce (e.g., minimize) product inventory and/or manufacturing costs. In some examples where channel segments 36 are substantially identical, the sidewalls 34 of each channel segment 36 are slightly stepped or tapered over their length so that the channel segments 36 can still extend and retract in a telescopic manner. FIG. 13, for example, shows the channel segment 36 having a back width 70 that is less than the channel segment's front width 72. In some examples, the sidewalls 34 converge at about 0.8 degrees (included angle) to provide about a two-centimeter difference in width between the front width 72 and the back width 70. In some examples, the material thickness of the sidewalls 34 is sufficiently thin and/or flexible to help create substantially similar (e.g., identical) channel segments 36 that can move telescopically relative to each other. In some examples, the flanges 58 help keep the sidewall's upper edges straight without reducing the sidewall's lateral flexibility. In some examples, the reinforcing structure 50 at the channel segment's front end 40 but not at the back end 56, provides the channel segments 36 with some structural rigidity while providing the sidewalls 34 at the back end 56 with more lateral flexibility. The additional flexibility at the back end 56 reduces (e.g., minimizes) lateral binding between overlapping channel segments 36 as the fence assembly 24 fully retracts.

In the example shown in FIG. 18, at least a portion of the sidewalls 34' are angled rather than being straight up and down, as compared to, for example, the channel segment 36 of FIG. 15, which has straight (e.g., vertical) sidewalls 34. Sidewalls 34' being angled adds rigidity along the sidewall's length and helps hold adjacent channel segments together in a vertical direction.

Track-following feature 48 engages the guide tracks 46 on the upper load bearing surface 44 to maintain or keep the channel segments 36 laterally centered relative to (e.g., over) the main conveyor assembly 10. In the illustrated examples, the track-following feature 48 is a slot formed in the reinforcing structure 50. FIG. 15 shows an example track-following feature 48 configured as a slot extending through the reinforcing structure 50 and up to the bottom panel 52. FIG. 17 shows an example track-following feature 48 configured as a slot extending partway or partially through the reinforcing structure 50 without the slot extending to the bottom panel 52. In the illustrated examples, the guide tracks 46 are metal bars or strips on each channel segment 36. The guide tracks 46 overlap each other (i.e., one above an adjacent one) similar to the same way that the upper load bearing surfaces 44 of the conveyor sections 12 overlap. The rollers 42, attached to the reinforcing structure 50, reduce (e.g., minimize) drag between the bottom panel 52 of the channel segment 36 and the upper load bearing surface 44 of the conveyor sections 12.

FIGS. 24 and 25 show an alternative to using the catches 60 and 62 to limit the overlap of the channel segments 36 in the fully extended configuration. Instead of catches 60 and 62, the channel segment 36 of FIGS. 24 and 25 uses a deformable elongate member 74 of limited length that ties together two adjacent channel segments 36 (e.g., ties the intermediate channel segment 36b to the distal channel segment 36c, and/or ties the intermediate channel segment 36b to the base channel segment 36a). The elongate member's limited length when pulled to a straight shape, as shown in FIG. 25, limits the extension of (e.g., two) adjacent overlapping channel segments 36 in the fully extended configuration. In the fully retracted configuration, the elongate member 74 deforms to a more compact shape, as shown in FIG. 24. Example materials of the elongate member 74 include, but are not limited to, a cable, a chain, a nylon strap, an elastic strap or cord, a spring, and/or various combinations thereof.

While the stop blocks 64 establish the telescopic arrangement of the channel segments 36 in the fully retracted configuration (FIG. 10), and the elongate member 74 or the catches 60 and 62 establish the telescopic arrangement of the channel segments 36 in the fully extended configuration (FIG. 7), the telescopic arrangement of the channel segments 36 is less definite in the partially extended configuration, as shown in FIGS. 8 and 9. When the channel segments 36 are free to shift lengthwise along the main conveyor assembly 10 in the partially extended configuration, the channel segments 36 tend to move in the same travel direction as the conveyor belt's upper portion 22a due to friction between the belt 22 and the channel segment's bottom panel 52. When the belt's upper portion 22a is moving forward, as indicated by arrow 28 in FIG. 9, the channel segments 36 also move forward. As a result, the channel segments 36 become biased toward the distal conveyor section 20. When the belt's upper portion 22a is moving in reverse, as indicated by arrow 30 in FIG. 8, the channel segments 36 tend to move in reverse. As a result, the channel segments 36 become biased toward the base conveyor section 16. This provides workers in the area a quick visual indication of which direction the belt 22 is moving, which can be helpful at times when no items are on the conveyor.

Some examples of the conveyor 26 allow the distal channel segment 36c to move upward and downward (e.g., vertically) relative to the distal conveyor section 20. FIG. 7, for instance, shows the distal channel segment 36c extending a first distance 76 above distal conveyor section 20, and FIG. 10 shows the distal channel segment 36c extending a second distance 78 above the distal conveyor section 20, where the second distance 78 is greater than the first distance 76. The distal channel segment's freedom of vertical movement allows the track-following feature 48 of the distal channel segment 36c to descend into engagement with the guide track 46 of the distal conveyor section 20 when conveyor assembly 10 is in the fully extended configuration, but reduces (e.g., minimizes) the vertical deflection of the fence assembly 24 in the fully retracted configuration. To enhance the fence assembly's ability to conform to the stepped upper load bearing surface 44 of the main conveyor assembly 10, the quantity of the channel segments 36, in some examples, is greater than the quantity of the conveyor sections 12. In some examples, an actuator (e.g., apparatus 38) connected to the front end 40 of the distal channel segment 36c drives the vertical movement of the distal channel segment 36c as a function of the conveyor's extension. Other examples include springs, sliders, pivot arms, etc., to facilitate, accommodate or guide the vertical movement of the distal channel segment 36c.

At least some of the aforementioned examples include one or more features and/or benefits including, but not limited to, the following:

In some example, a conveyor includes a main conveyor assembly having a plurality of conveyor sections including at least a base conveyor section, an intermediate conveyor section and a distal conveyor section. The main conveyor assembly is adjustable in a lengthwise direction selectively to a fully retracted configuration, a partially extended configuration and a fully extended configuration. The main conveyor assembly being longer in the lengthwise direction in the fully extended configuration than in the partially extended configuration, and the main conveyor assembly being longer in the lengthwise direction in the partially extended configuration than in the fully retracted configuration. The intermediate conveyor section being interposed between the base conveyor section and the distal conveyor section with respect to the lengthwise direction. The intermediate conveyor section has an upper load bearing surface. A conveyor belt has an upper portion to travel in the lengthwise direction relative to the main conveyor assembly.

A fence assembly has a plurality of channel segments including at least a base channel segment, an intermediate channel segment, and a distal channel segment. The fence assembly is adjustable in the lengthwise direction such that the fence assembly is longer in the lengthwise direction when the main conveyor assembly is in the fully extended configuration than when the main conveyor assembly is in the fully retracted configuration. The intermediate channel segment is interposed between the base channel segment and the distal channel segment with respect to the lengthwise direction. Each channel segment of the plurality of channel segments including sidewalls extending upward from a bottom panel. The intermediate channel segment is to move in translation in the lengthwise direction relative to the intermediate conveyor section. The bottom panel of the intermediate channel segment being positioned between the upper portion of the conveyor belt and the upper load bearing surface of the intermediate conveyor section. The upper portion of the conveyor belt being interposed between the sidewalls with reference to a lateral direction. The lateral direction is horizontal and perpendicular to the lengthwise direction.

In some examples, each conveyor section of the plurality of conveyor sections includes a guide track segment, thereby providing a plurality of guide track segments that extend lengthwise along the main conveyor assembly. The plurality of guide track segments to overlap one another when the main conveyor assembly is in the fully retracted position, and at least some of the plurality of guide track segments engage a track-following feature defined by the fence assembly.

In some examples, the track-following feature is a slot defined by the fence assembly.

In some examples, at least one guide track segment of the plurality of guide track segments is disposed on the upper load bearing surface of the intermediate conveyor section.

In some examples, a front catch protrudes from each of the base channel segment and the intermediate channel segment. In some examples, a rear catch protrudes from each of the intermediate channel segment and the distal channel segment. The front catch of the intermediate channel segment engages the rear catch of the distal channel segment when the main conveyor assembly is in the fully extended configuration. The front catch of the intermediate channel segment is spaced apart from the rear catch of the distal channel segment when the main conveyor assembly is in the fully retracted configuration.

In some examples, a front catch protrudes from each of the base channel segment and the intermediate channel segment. In some such examples, a rear catch protrudes from each of the intermediate channel segment and the distal channel segment. The front catch of the base channel segment engages the rear catch of the intermediate channel segment when the main conveyor assembly is in the fully extended configuration. The front catch of the base channel segment is spaced apart from the rear catch of the intermediate channel segment when the main conveyor assembly is in the fully retracted configuration.

In some examples, the front catch of the base channel segment is to press resiliently in the lateral direction against at least one of the sidewalls of the intermediate channel segment.

In some examples, the rear catch of the intermediate channel segment is to press resiliently in the lateral direction against at least one of the sidewalls of the base channel segment.

In some examples, a magnet interposed between the bottom panel of the intermediate channel segment and the upper load bearing surface of the intermediate conveyor section, the magnet to urge the bottom panel of the intermediate channel segment and the upper load bearing surface of the intermediate conveyor section toward each other.

In some examples, the distal channel segment is to extend a first distance upward from the distal conveyor section when the main conveyor assembly is in the fully extended configuration. In some examples, the distal channel segment is to extend a second distance upward from the distal conveyor section when the main conveyor assembly is in the fully retracted configuration, where the second distance is greater than the first distance.

In some examples, the intermediate channel segment is elongate in the lengthwise direction between a front end of the intermediate channel segment and a back end of the intermediate channel segment. In some examples, the distal conveyor section being closer to the front end than to the back end when the main conveyor assembly is in the fully extended configuration, the sidewalls of the intermediate channel segment being laterally more flexible at the back end than at the front end.

In some examples, each of channel segment of the plurality of channel segments is substantially identical, and the plurality of channel segments overlap each other in the lengthwise direction to provide the fence assembly with a nested arrangement that renders the fence assembly adjustable in the lengthwise direction.

In some examples, the plurality of conveyor sections is of a first quantity, and the plurality of channel segments is of a second quantity, wherein the second quantity is greater than the first quantity.

In some examples, the intermediate channel segment is biased toward the distal conveyor section when the main conveyor assembly is in the partially extended configuration while the upper portion of the conveyor belt travels in a forward direction toward the distal conveyor section. In some examples, the intermediate channel segment is biased toward the base conveyor section when the main conveyor assembly is in the partially extended configuration while the upper portion of the conveyor belt travels in a reverse direction toward the base conveyor section.

In some examples, a roller interposed between the bottom panel of the intermediate channel segment and the upper load bearing surface of the intermediate conveyor section.

In some examples, a deformable elongate member extending between the distal channel segment and the intermediate channel segment. The deformable elongate member has a first shape when the main conveyor assembly is in the fully extended configuration and a second shape when the main conveyor assembly is in the fully retracted configuration, where the first shape is distinguishable or different from the second shape.

In some examples, a conveyor includes a main conveyor assembly having a plurality of conveyor sections including at least a base conveyor section, an intermediate conveyor section and a distal conveyor section. The main conveyor assembly being adjustable in a lengthwise direction selectively to a fully retracted configuration, a partially extended configuration and a fully extended configuration. The main conveyor assembly being longer in the fully extended configuration than in the partially extended configuration. The main conveyor assembly being longer in the partially extended configuration than in the fully retracted configuration. The intermediate conveyor section being interposed between the base conveyor section and the distal conveyor section with respect to the lengthwise direction. A conveyor belt has an upper portion traveling in the lengthwise direction relative to the main conveyor assembly. A fence assembly includes a plurality of fence segments including a given fence segment, the plurality of fence segments overlapping in the lengthwise direction to provide the fence assembly with a nested arrangement that renders the fence assembly adjustable in the lengthwise direction such that the fence assembly is longer when the main conveyor assembly is in the fully extended configuration than when the main conveyor assembly is in the fully retracted configuration. Each fence segment of the plurality of fence segments including a pair of sidewalls extending upward. The pair of sidewalls of each fence segment flanking the upper portion of the conveyor belt with reference to a lateral direction that is horizontal and perpendicular to the lengthwise direction. The pair of sidewalls of the given fence segment extending in the lengthwise direction between a first end and a second end of the given fence segment. The pair of sidewalls of the given fence segment being spaced apart a first lateral distance at the first end and being spaced apart a second lateral distance at the second end, where the first lateral distance is greater than the second lateral distance.

In some examples, the fence assembly extends underneath the upper portion of the conveyor belt.

In some examples, each conveyor section of the plurality of conveyor sections includes a guide track segment, thereby providing a plurality of guide track segments that extend lengthwise along the main conveyor assembly, the plurality of guide track segments overlapping one another when the main conveyor assembly is in the fully retracted position, and at least some of the plurality of guide track segments to engage a track-following feature defined by the fence assembly.

In some examples, the track-following feature is a slot defined by the fence assembly.

In some examples, at least one guide track segment of the plurality of guide track segments is positioned underneath the upper portion of the conveyor belt.

In some examples, the plurality of fence segments includes at least a base fence segment, an intermediate fence segment, and a distal fence segment. The intermediate fence segment being interposed between the base fence segment and the distal fence segment with respect to the lengthwise direction. The conveyor further including a front catch protruding from each of the base channel segment and the intermediate channel segment, and a rear catch protruding from each of the intermediate channel segment and the distal channel segment. The front catch of the intermediate channel segment engaging the rear catch of the distal channel segment when the main conveyor assembly is in the fully extended configuration. The front catch of the intermediate channel segment being spaced apart from the rear catch of the distal channel segment when the main conveyor assembly is in the fully retracted configuration.

In some examples, the plurality of fence segments includes at least a base fence segment, an intermediate fence segment, and a distal fence segment. The intermediate fence segment being interposed between the base fence segment and the distal fence segment with respect to the lengthwise direction. The conveyor further including a front catch protruding from each of the base channel segment and the intermediate channel segment, and a rear catch protruding from each of the intermediate channel segment and the distal channel segment. The front catch of the base channel segment to engage the rear catch of the intermediate channel segment when the main conveyor assembly is in the fully extended configuration. The front catch of the base channel segment being spaced apart from the rear catch of the intermediate channel segment when the main conveyor assembly is in the fully retracted configuration.

In some examples, the front catch of the base channel segment is to press resiliently in the lateral direction against the pair of sidewalls of the intermediate channel segment.

In some examples, the rear catch of the intermediate channel segment is to press resiliently in the lateral direction against the pair of sidewalls of the base channel segment.

In some examples, a magnet interposed between the fence assembly and the main conveyor assembly, the magnet to urge the fence assembly and the main conveyor assembly toward each other.

In some examples, the fence assembly is to extend a first distance upward from the distal conveyor section when the main conveyor assembly is in the fully extended configuration. In some examples, the fence assembly is to extend a second distance upward from the distal conveyor section when the main conveyor assembly is in the fully retracted configuration, where the second distance is greater than the first distance.

In some examples, the pair of sidewalls of the given fence segment is laterally more flexible at the first end than at the second end.

In some examples, each of the fence segments of the plurality of fence segments are substantially identical to each other.

In some examples, the plurality of conveyor sections provides a first quantity of conveyor sections, and the plurality of fence segments provide a second quantity of conveyor sections greater than the first quantity.

In some examples, the given fence segment is biased toward the distal conveyor section when the main conveyor assembly is in the partially extended configuration while the upper portion of the conveyor belt travels in a forward direction toward the distal conveyor section. The given fence segment is biased toward the base conveyor section when the main conveyor assembly is in the partially extended configuration while the upper portion of the conveyor belt travels in a reverse direction toward the base conveyor section.

In some examples, a roller interposed between the fence assembly and the main conveyor assembly.

In some examples, a deformable elongate member extending between two fence segments of the plurality of fence segments. The deformable elongate member having a first shape when the main conveyor assembly is in the fully extended configuration and a second shape when the main conveyor assembly is in the fully retracted configuration, where the first shape is distinguishable from the second shape.

In some examples, a conveyor includes a main conveyor assembly including a plurality of conveyor sections of a first quantity, the plurality of conveyor sections including at least a base conveyor section, an intermediate conveyor section and a distal conveyor section. The main conveyor assembly being adjustable in a lengthwise direction selectively to a fully retracted configuration, a partially extended configuration and a fully extended configuration. The main conveyor assembly being longer in the fully extended configuration than in the partially extended configuration, and the main conveyor assembly being longer in the partially extended configuration than in the fully retracted configuration. The intermediate conveyor section being interposed between the base conveyor section and the distal conveyor section with respect to the lengthwise direction. A conveyor belt has an upper portion to move in the lengthwise direction relative to the main conveyor assembly. A fence assembly includes a plurality of fence segments of a second quantity greater than the first quantity. The plurality of fence segments overlapping in the lengthwise direction to provide the fence assembly with a nested arrangement that renders the fence assembly adjustable in the lengthwise direction such that the fence assembly is longer when the main conveyor assembly is in the fully extended configuration than when the main conveyor assembly is in the fully retracted configuration. Each fence segment of the plurality of fence segments has a pair of sidewalls extending upward. The pair of sidewalls of each fence segment flanking the upper portion of the conveyor belt with reference to a lateral direction that is horizontal and perpendicular to the lengthwise direction.

In some examples, the fence assembly extends underneath the upper portion of the conveyor belt.

In some examples, each conveyor section of the plurality of conveyor sections includes a guide track segment, thereby providing a plurality of guide track segments that extend lengthwise along the main conveyor assembly. The plurality of guide track segments to overlap one another when the main conveyor assembly is in the fully retracted position, and at least some of the plurality of guide track segments engage a track-following feature defined by the fence assembly.

In some examples, the track-following feature is a slot defined by the fence assembly.

In some examples, at least one guide track segment of the plurality of guide track segments is underneath the upper portion of the conveyor belt.

In some examples, the plurality of fence segments includes at least a base fence segment, an intermediate fence segment, and a distal fence segment. The intermediate fence segment being interposed between the base fence segment and the distal fence segment with respect to the lengthwise direction. The conveyor further including a front catch protruding from each of the base channel segment and the intermediate channel segment, and a rear catch protruding from each of the intermediate channel segment and the distal channel segment. The front catch of the intermediate channel segment engages the rear catch of the distal channel segment when the main conveyor assembly is in the fully extended configuration. The front catch of the intermediate channel segment being spaced apart from the rear catch of the distal channel segment when the main conveyor assembly is in the fully retracted configuration.

In some examples, the plurality of fence segments includes at least a base fence segment, an intermediate fence segment, and a distal fence segment. The intermediate fence segment being interposed between the base fence segment and the distal fence segment with respect to the lengthwise direction. In some examples, the conveyor further includes a front catch protruding from each of the base channel segment and the intermediate channel segment, and a rear catch protruding from each of the intermediate channel segment and the distal channel segment. The front catch of the base channel segment engaging the rear catch of the intermediate channel segment when the main conveyor assembly is in the fully extended configuration. The front catch of the base channel segment being spaced apart from the rear catch of the intermediate channel segment when the main conveyor assembly is in the fully retracted configuration.

In some examples, the front catch of the base channel segment is to press resiliently in the lateral direction against the pair of sidewalls of the intermediate channel segment.

In some examples, the rear catch of the intermediate channel segment is to press resiliently in the lateral direction against the pair of sidewalls of the base channel segment.

In some examples, a magnet interposed between the fence assembly and the main conveyor assembly. The magnet to urge the fence assembly and the main conveyor assembly toward each other.

In some examples, the fence assembly extends a first distance upward from the distal conveyor section when the main conveyor assembly is in the fully extended configuration. The fence assembly extends a second distance upward from the distal conveyor section when the main conveyor assembly is in the fully retracted configuration. The second distance being greater than the first distance.

In some examples, the given fence segment is elongate in the lengthwise direction between a first end and a second end of the given fence segment, and the pair of sidewalls of the given fence segment is laterally more flexible at the first end than at the second end.

In some examples, the fence segments of the plurality of fence segments are substantially identical to each other.

In some examples, the given fence segment is biased toward the distal conveyor section when the main conveyor assembly is in the partially extended configuration while the upper portion of the conveyor belt moves in a forward direction toward the distal conveyor section. The given fence segment being biased toward the base conveyor section when the main conveyor assembly is in the partially extended configuration while the upper portion of the conveyor belt moves in a reverse direction toward the base conveyor section.

In some examples, a roller interposed between the fence assembly and the main conveyor assembly.

In some examples, a deformable elongate member extending between two fence segments of the plurality of fence segments. The deformable elongate member having a first shape when the main conveyor assembly is in the fully extended configuration and having a second shape when the main conveyor assembly is in the fully retracted configuration, where the first shape is distinguishable from the second shape.

In some examples, a conveyor including a main conveyor assembly having a plurality of conveyor sections including at least a base conveyor section, an intermediate conveyor section and a distal conveyor section. The main conveyor assembly being adjustable in a lengthwise direction selectively to a fully retracted configuration, a partially extended configuration and a fully extended configuration. The main conveyor assembly being longer in the fully extended configuration than in the partially extended configuration, and the main conveyor assembly being longer in the partially extended configuration than in the fully retracted configuration. The intermediate conveyor section being interposed between the base conveyor section and the distal conveyor section with respect to the lengthwise direction. A conveyor belt has an upper portion movable in the lengthwise direction relative to the main conveyor assembly. A fence assembly has a plurality of fence segments including at least a base fence segment, an intermediate fence segment, and a distal fence segment. The fence assembly being adjustable in the lengthwise direction such that the fence assembly is longer when the main conveyor assembly is in the fully extended configuration than when the main conveyor assembly is in the fully retracted configuration. The intermediate fence segment being interposed between the base fence segment and the distal fence segment with respect to the lengthwise direction. The distal fence segment extending a first distance upward from the distal conveyor section when the main conveyor assembly is in the fully extended configuration. The distal fence segment extending a second distance upward from the distal conveyor section when the main conveyor assembly is in the fully retracted configuration. The second distance being greater than the first distance.

In some examples, each conveyor section of the plurality of conveyor sections includes a guide track segment, thereby providing a plurality of guide track segments that extend lengthwise along the main conveyor assembly. The plurality of guide track segments to overlap one another when the main conveyor assembly is in the fully retracted position. At least some of the plurality of guide track segments engage a track-following feature defined by the fence assembly.

In some examples, the track-following feature is a slot defined by the fence assembly.

In some examples, at least one guide track segment of the plurality of guide track segments is underneath the upper portion of the conveyor belt.

In some examples, a magnet interposed between the fence assembly and the main conveyor assembly, the magnet to urge the fence assembly and the main conveyor assembly toward each other.

In some examples, the fence segments of the plurality of fence segments are substantially identical to each other, and the plurality of fence segments overlap each other in the lengthwise direction to provide the fence assembly with an arrangement that renders the fence assembly adjustable in the lengthwise direction.

In some examples, the conveyor sections are of a first quantity, and the fence segments are of a second quantity. The second quantity being greater than the first quantity.

In some examples, the intermediate fence segment is biased toward the distal conveyor section when the main conveyor assembly is in the partially extended configuration while the upper portion of the conveyor belt moves in a forward direction toward the distal conveyor section. The intermediate fence segment being biased toward the base conveyor section when the main conveyor assembly is in the partially extended configuration while the upper portion of the conveyor belt moves in a reverse direction toward the base conveyor section.

In some examples, a roller is interposed between the main conveyor assembly and the fence assembly.

In some examples, a deformable elongate member extends between the distal fence segment and the intermediate fence segment. The deformable elongate member having a first shape when the main conveyor assembly is in the fully extended configuration and having a second shape when the main conveyor assembly is in the fully retracted configuration, where the first shape is distinguishable from the second shape.

In some examples, a conveyor including a main conveyor assembly having a plurality of conveyor sections including at least a base conveyor section, an intermediate conveyor section and a distal conveyor section. The main conveyor assembly being adjustable in a lengthwise direction selectively to a fully retracted configuration, a partially extended configuration and a fully extended configuration. The main conveyor assembly being longer in the fully extended configuration than in the partially extended configuration, and the main conveyor assembly being longer in the partially extended configuration than in the fully retracted configuration. The intermediate conveyor section being interposed between the base conveyor section and the distal conveyor section with respect to the lengthwise direction. A conveyor belt having an upper portion movable in the lengthwise direction selectively in a forward direction and a reverse direction relative to the main conveyor assembly. A fence assembly having a plurality of fence segments including at least a base fence segment, an intermediate fence segment, and a distal fence segment. The fence assembly being adjustable in the lengthwise direction such that the fence assembly is longer when the main conveyor assembly is in the fully extended configuration than when the main conveyor assembly is in the fully retracted configuration. The intermediate fence segment being interposed between the base fence segment and the distal fence segment with respect to the lengthwise direction. Each fence segment of the plurality of fence segments having a pair of sidewalls extending upward. The pair of sidewalls of each fence segment flanking the upper portion of the conveyor belt with reference to a lateral direction that is horizontal and perpendicular to the lengthwise direction. The plurality of fence segments having selectively a first distribution arrangement and a second distribution arrangement along the main conveyor assembly when the main conveyor assembly is in the partially extended configuration. The plurality of fence segments being in the first distribution arrangement when the upper portion of the conveyor belts is moving in the forward direction. The plurality of fence segments being in the second distribution arrangement when the upper portion of the conveyor belts is moving in the reverse direction. The intermediate fence segment being closer to the distal conveyor section when the plurality of fence segments are in the first distribution arrangement than when the plurality of fence segments are in the second distribution arrangement.

In some examples, the fence assembly extends underneath the upper portion of the conveyor belt.

In some examples, each conveyor section of the plurality of conveyor sections includes a guide track segment, thereby providing a plurality of guide track segments that extend lengthwise along the main conveyor assembly. The plurality of guide track segments to overlap one another when the main conveyor assembly is in the fully retracted position, and at least some of the plurality of guide track segments engage a track-following feature defined by the fence assembly.

In some examples, the track-following feature is a slot defined by the fence assembly.

In some examples, at least one guide track segment of the plurality of guide track segments is underneath the upper portion of the conveyor belt.

In some examples, the distal fence segment extends a first distance upward from the distal conveyor section when the main conveyor assembly is in the fully extended configuration, the distal fence segment extends a second distance upward from the distal conveyor section when the main conveyor assembly is in the fully retracted configuration. The second distance being greater than the first distance.

In some examples, the conveyor sections are of a first quantity, and the fence segments are of a second quantity, wherein the second quantity is greater than the first quantity.

In some examples, a roller interposed between the intermediate conveyor section and the intermediate fence segment.

In some examples, a deformable elongate member extending between the distal fence segment and the intermediate fence segment. The deformable elongate member includes a first shape when the main conveyor assembly is in the fully extended configuration and having a second shape when the main conveyor assembly is in the fully retracted configuration, wherein the first shape is distinguishable from the second shape.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A conveyor comprising:
a main conveyor assembly having a plurality of conveyor sections including at least a base conveyor section, an intermediate conveyor section and a distal conveyor section, the main conveyor assembly being adjustable in a lengthwise direction selectively to a fully retracted configuration, a partially extended configuration and a fully extended configuration, the main conveyor assembly being longer in the lengthwise direction in the fully extended configuration than in the partially extended configuration, and the main conveyor assembly being longer in the lengthwise direction in the partially extended configuration than in the fully retracted configuration, the intermediate conveyor section being interposed between the base conveyor section and the distal conveyor section with respect to the lengthwise direction, and the intermediate conveyor section having an upper load bearing surface;
a conveyor belt having an upper portion to travel in the lengthwise direction relative to the main conveyor assembly; and
a fence assembly having a plurality of channel segments including at least a base channel segment, an intermediate channel segment, and a distal channel segment, the fence assembly being adjustable in the lengthwise direction such that the fence assembly is longer in the lengthwise direction when the main conveyor assembly is in the fully extended configuration than when the main conveyor assembly is in the fully retracted configuration, the intermediate channel segment being interposed between the base channel segment and the distal channel segment with respect to the lengthwise direction, each channel segment of the plurality of channel segments including sidewalls extending upward from a bottom panel, the intermediate channel segment to move in translation in the lengthwise direction relative to the intermediate conveyor section, the bottom panel of the intermediate channel segment being positioned between the upper portion of the conveyor belt and the upper load bearing surface of the intermediate conveyor section, the upper portion of the conveyor belt being interposed between the sidewalls with reference to a lateral direction, wherein the lateral direction is horizontal and perpendicular to the lengthwise direction.

2. The conveyor of claim 1, wherein each conveyor section of the plurality of conveyor sections includes a guide track segment, thereby providing a plurality of guide track segments that extend lengthwise along the main conveyor assembly, the plurality of guide track segments to overlap one another when the main conveyor assembly is in the fully retracted configuration, and at least some of the plurality of guide track segments engage a track-following feature defined by the fence assembly.

3. The conveyor of claim 2, wherein the track-following feature is a slot defined by the fence assembly.

4. The conveyor of claim 2, wherein at least one guide track segment of the plurality of guide track segments is disposed on the upper load bearing surface of the intermediate conveyor section.

5. The conveyor of claim 1, further comprising:
a front catch protruding from each of the base channel segment and the intermediate channel segment; and
a rear catch protruding from each of the intermediate channel segment and the distal channel segment, the front catch of the intermediate channel segment engaging the rear catch of the distal channel segment when the main conveyor assembly is in the fully extended configuration, the front catch of the intermediate channel segment being spaced apart from the rear catch of the distal channel segment when the main conveyor assembly is in the fully retracted configuration.

6. The conveyor of claim 1, further comprising:
a front catch protruding from each of the base channel segment and the intermediate channel segment; and
a rear catch protruding from each of the intermediate channel segment and the distal channel segment, the front catch of the base channel segment engaging the rear catch of the intermediate channel segment when the main conveyor assembly is in the fully extended configuration, the front catch of the base channel segment being spaced apart from the rear catch of the intermediate channel segment when the main conveyor assembly is in the fully retracted configuration.

7. The conveyor of claim 6, wherein the front catch of the base channel segment is to press resiliently in the lateral direction against at least one of the sidewalls of the intermediate channel segment.

8. The conveyor of claim 6, wherein the rear catch of the intermediate channel segment is to press resiliently in the lateral direction against at least one of the sidewalls of the base channel segment.

9. The conveyor of claim 1, further comprising a magnet interposed between the bottom panel of the intermediate channel segment and the upper load bearing surface of the intermediate conveyor section, the magnet to urge the bottom panel of the intermediate channel segment and the upper load bearing surface of the intermediate conveyor section toward each other.

10. The conveyor of claim 1, wherein the distal channel segment is to extend a first distance upward from the distal conveyor section when the main conveyor assembly is in the fully extended configuration, the distal channel segment is to extend a second distance upward from the distal conveyor section when the main conveyor assembly is in the fully retracted configuration, wherein the second distance is greater than the first distance.

11. The conveyor of claim 1, wherein the intermediate channel segment is elongate in the lengthwise direction between a front end of the intermediate channel segment and a back end of the intermediate channel segment, the distal conveyor section being closer to the front end than to the back end when the main conveyor assembly is in the fully extended configuration, the sidewalls of the intermediate channel segment being laterally more flexible at the back end than at the front end.

12. The conveyor of claim 1, wherein each of channel segment of the plurality of channel segments is substantially identical, and the plurality of channel segments overlap each other in the lengthwise direction to provide the fence assembly with a nested arrangement that renders the fence assembly adjustable in the lengthwise direction.

13. The conveyor of claim 1, wherein the plurality of conveyor sections is of a first quantity, and the plurality of channel segments is of a second quantity, wherein the second quantity is greater than the first quantity.

14. The conveyor of claim 1, wherein the intermediate channel segment is biased toward the distal conveyor section when the main conveyor assembly is in the partially extended configuration while the upper portion of the conveyor belt travels in a forward direction toward the distal conveyor section, and the intermediate channel segment is biased toward the base conveyor section when the main conveyor assembly is in the partially extended configuration while the upper portion of the conveyor belt travels in a reverse direction toward the base conveyor section.

15. The conveyor of claim 1, further comprising a roller interposed between the bottom panel of the intermediate channel segment and the upper load bearing surface of the intermediate conveyor section.

16. The conveyor of claim 1, further comprising a deformable elongate member extending between the distal channel segment and the intermediate channel segment, the deformable elongate member having a first shape when the main conveyor assembly is in the fully extended configuration and a second shape when the main conveyor assembly is in the fully retracted configuration, wherein the first shape is distinguishable or different from the second shape.

17. A conveyor comprising:
a main conveyor assembly having a plurality of conveyor sections;
a conveyor belt having an upper portion to travel in a lengthwise direction relative to the main conveyor assembly; and
a plurality of channel segments, respective ones of the channel segments to couple to corresponding respective ones of the conveyor sections, the channel segments to move with the corresponding respective ones of the conveyor sections when the conveyor moves between an extended position and a retracted position, each of the channel segments including:
sidewalls; and
a bottom panel positioned between an upper portion of the conveyor belt and an upper load bearing surface of the conveyor section, the upper portion of the conveyor belt being interposed between the sidewalls with reference to a lateral direction, the lateral direction being horizontal and perpendicular to the lengthwise direction.

18. The conveyor of claim 17, wherein each of the channel segments has a lower panel to be positioned between an upper portion of the conveyor belt and a corresponding respective one of an upper load bearing surface of the conveyor sections.

19. The conveyor of claim 18, wherein each of the channel segments includes a first side wall adjacent a first lateral edge of the lower panel and a second side wall adjacent a second lateral edge of the lower panel opposite the first lateral edge.

20. The conveyor of claim 19, wherein the first and second side walls extend in a direction away from the lower panel.

21. The conveyor of claim 20, wherein the first and second side walls are perpendicular relative to the lower panel.

22. The conveyor of claim 20, wherein the first and second side walls are non-perpendicular relative to the lower panel.

23. The conveyor of claim 20, wherein an upper portion of the conveyor belt is interposed between the first side wall and the second side wall with reference to a lateral direction, wherein the lateral direction is non-parallel relative to the lengthwise direction of the conveyor.

24. The conveyor of claim 18, wherein the lower panel of the channel segments includes a pair of rollers to reduce friction between the lower panel and the upper load bearing surface.

25. The conveyor of claim 18, wherein the lower panel of the channels segments includes guides to receive guide tracks of the upper load bearing surface.

26. A conveyor comprising:
a main conveyor assembly having a plurality of conveyor sections including at least a base conveyor section and a distal conveyor section, the main conveyor assembly being adjustable in a lengthwise direction selectively to a retracted configuration and an extended configuration, the main conveyor assembly being longer in the extended configuration than in the retracted configuration;
a conveyor belt to move relative to the main conveyor assembly in a lengthwise direction of the main conveyor; and
a fence assembly including a plurality of channel segments, the channel segments to provide a nested arrangement that renders the fence assembly adjustable in the lengthwise direction such that the fence assembly is longer when the main conveyor assembly is in the extended configuration than when the main conveyor assembly is in the retracted configuration, each channel segment of the plurality of channel segments including:
a pair of sidewalls extending upward to flank the conveyor belt; and
a bottom panel positioned between an upper portion of the conveyor belt and an upper load bearing surface of the conveyor section, the upper portion of the conveyor belt being interposed between the sidewalls with reference to a lateral direction, the lateral direction being horizontal and perpendicular to the lengthwise direction.

27. The conveyor of claim 26, wherein the fence assembly extends underneath an upper portion of the conveyor belt.

28. The conveyor of claim 26, wherein each conveyor section of the plurality of conveyor sections includes a guide track segment, thereby providing a plurality of guide track segments that extend lengthwise along the main conveyor assembly, the plurality of guide track segments overlapping one another when the main conveyor assembly is in the retracted configuration, and at least some of the plurality of guide track segments to engage a track-following feature defined by the channel segments of the fence assembly.

29. The conveyor of claim 28, wherein the track-following feature is a slot defined by the channel segments of the fence assembly.

30. The conveyor of claim 26, further comprising a magnet interposed between the fence assembly and the main conveyor assembly, the magnet to urge the fence assembly toward the main conveyor assembly.

* * * * *